United States Patent [19]

Wiebelhaus et al.

[11] Patent Number: 5,429,214
[45] Date of Patent: Jul. 4, 1995

[54] VENTILATED BRAKE DISC WITH TRANSVERSE RECESSES IN RADIALLY EXTENDING RIBS

[75] Inventors: Wolfgang Wiebelhaus, Mülheim; Jürgen Schneider, Bochum; Hans Rocholl, Remscheid; Manfred Gronemann, Remscheid; Wolfgang Lehmann, Remscheid, all of Germany

[73] Assignee: Bergische Stahl-Industrie, Remscheid, Germany

[21] Appl. No.: 228,457

[22] Filed: Apr. 15, 1994

Related U.S. Application Data

[63] Continuation-in-part of Ser. No. 806,654, Dec. 13, 1991, abandoned.

[30] Foreign Application Priority Data

Dec. 18, 1990 [DE] Germany .................. 40 40 423.4

[51] Int. Cl.⁶ ............................................. F16D 55/02
[52] U.S. Cl. ........................ 188/218 XL; 188/264 A; 188/71.6
[58] Field of Search .......... 188/18 A, 218 R, 218 XL, 188/264 R, 264 A, 264 AA, 71.6, 58, 26; 192/70.12, 113 A; 301/6 A, 6 CS, 6 CF, 6 WB

[56] References Cited

U.S. PATENT DOCUMENTS

| 2,800,982 | 7/1957 | Cottrell | 188/264 A X |
| 3,809,192 | 5/1974 | Stehle | 192/113 A X |
| 4,083,435 | 4/1978 | Gallus et al. | 188/218 XL |
| 4,638,891 | 1/1987 | Wirth | 301/6 CS X |
| 4,853,574 | 8/1989 | Estaque | 188/264 A X |
| 5,004,078 | 4/1991 | Oono et al. | 188/71.6 X |

FOREIGN PATENT DOCUMENTS

| 2062407 | 12/1970 | Germany . |
| 2228738 | 6/1972 | Germany . |
| 7618775 | 6/1976 | Germany . |

*Primary Examiner*—Josie A. Ballato
*Attorney, Agent, or Firm*—Robert W. Becker & Associates

[57] ABSTRACT

A ventilated brake disc for rail vehicles of a divided or undivided design is provided. The brake disc comprises a brake ring with ribs connected to the hub. Projections for fastening the brake ring to the hub are connected to selected ribs having recesses. In another design the brake ring, within its neutral range, is provided with projections arranged opposite one another at a dividing groove, each projection having a respective tangential bore for receiving a screw for fastening the sections of the divided brake ring, whereby a portion of the ribs in the area of the projections extends radially inwardly and radially outwardly from the projections. In another design first projections have respective first tangential bores aligned with one another for receiving a first screw are positioned opposite one another at a dividing groove of the brake ring in the vicinity of its inner circumference. Second projections have second tangential bores aligned with one another for receiving a second screw and are positioned opposite one another at the dividing groove of the brake ring in the vicinity of its outer circumference, whereby a portion of the ribs in the area of the first and second projections extends in a radial direction between the first and second projection to a maximum possible length. With these designs an improvement of the cooling air flow is achieved due to the generation of a transverse flow.

12 Claims, 8 Drawing Sheets

VENTILATED BRAKE DISC WITH TRANSVERSE RECESSES IN RADIALLY EXTENDING RIBS

This application is a continuation-in-part of application Ser. No. 07/806,654 filed Dec. 13, 1991 now abandoned.

BACKGROUND OF THE INVENTION

The present invention relates to a ventilated divided or undivided brake disc for rail vehicles which comprises a hub and a brake ring which is fixedly or releasably connected to the hub whereby optionally selected ribs are elongated and/or widened to form projections for the connection of the brake ring to the hub.

Brake discs of the aforementioned design are for example known from DE 20 62 407 C2 or DE 22 28 738 C2 whereby it is obvious that with these known constructions the flow of cooling air at the connection along the dividing groove is impaired or even completely interrupted. Furthermore, due to the missing cooling air ribs within the connecting area the cooling surface is substantially reduced which results in a substantial impairment of the cooling of the brake discs. The loss of cooling surface may be as much as 30%. An especially drastic loss occurs due to the construction according to German Gbm 76 18 775.

It is therefore an object of the present invention to avoid the disadvantages of the known constructions of divided brake discs and, in particular, to provide a maximized cooling surface without complicating the design of the brake discs and thereby increasing their weight.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
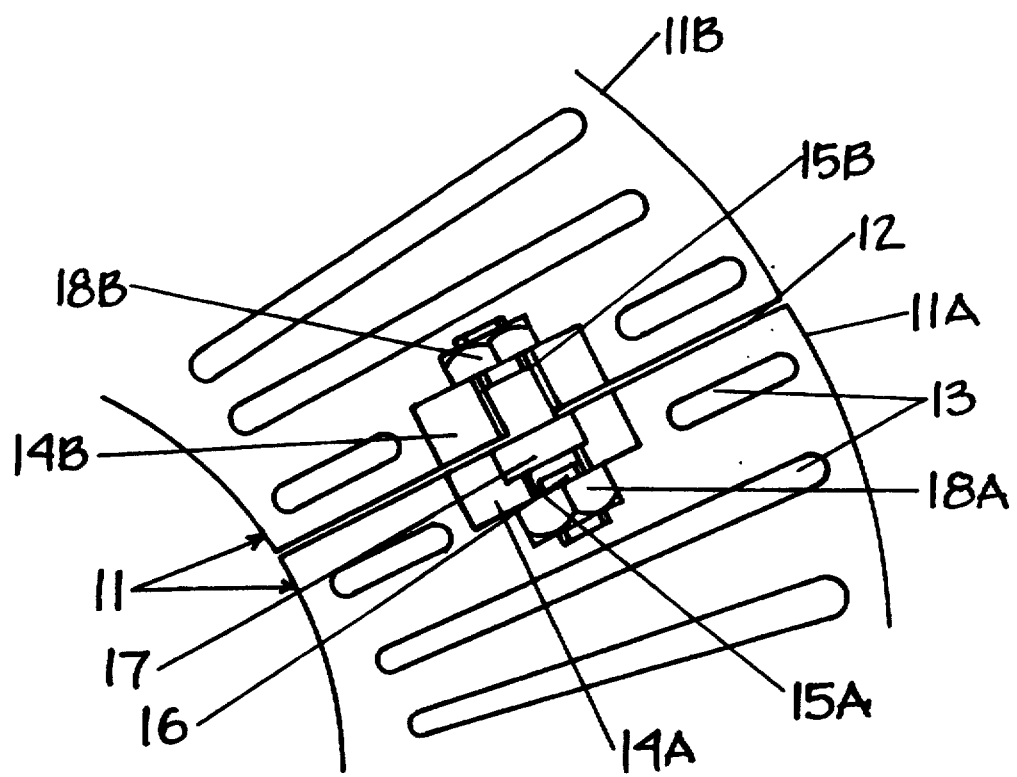
FIG. 1 shows a part-sectional end view of the backside of the connection of two brake ring sections.

The ventilated brake disc for rail vehicles of the present invention is primarily characterized by the brake disc comprising an undivided brake ring that is connected to a hub, with ribs being provided on the brake ring, and projections for fastening the brake ring to the hub, whereby the projections are connected to selected ones of the ribs, with the selected ribs being provided with tangentially extending and concentrically extending recesses.

In another embodiment the brake disc comprises a brake ring that is connected to the hub and is divided by a dividing groove along a plane that is parallel to an axis of the brake disc, and having ribs provided on the brake ring, and further comprising projections for fastening the brake ring to the hub, the projections being connected to selected ones of the ribs, with selected ribs being provided with recesses, the recesses being consisting of tangentially extending and concentrically extending recesses, with a portion of the ribs that is adjacent to the dividing groove being provided with further recesses.

In both of the above embodiments, the brake ring may be fixedly connected or releasably connected to the hub. The recesses may extend tangentially or concentrically relative to the brake ring and may be provided in the form of bores or perforations. In the tangential recesses further ribs may be provided. The projections may be formed as an integral part of the selected ribs by elongating and/or widening selected ribs.

In another embodiment of the present invention a divided ventilated brake disc for rail vehicles is primarily characterized by being provided with ribs and having, within the neutral range of the brake ring, at least one pair of projections arranged opposite one another at a dividing groove, each one of the projections having s respective tangential bore aligned with one another for receiving a screw for fastening sections of the divided brake disc, whereby a portion of the ribs that are provided in the area of the projections extends radially inwardly and radially outwardly from the projections. The screw is provided with a threaded portion at either end. Preferably, the screw has a securing means against rotation. This securing means is preferably arranged at the center of the screw between the two threaded portions and is, for example, in the form of a square rod which is inserted into a respectively formed recess of the brake ring section.

In another preferred embodiment the divided ventilated brake disc for rail vehicles is characterized by being provided with ribs and having, within a neutral range of the brake disc, at least one pair of first projections having a respective first tangential bore aligned with one another for receiving a first screw, the first projections being positioned opposite one another at a dividing groove of the brake ring in the vicinity of an inner circumference of the brake ring, and at least one pair of second projections having a respective second tangential bore aligned with one another for receiving a second screw said projections being positioned opposite one another at the dividing groove of the brake ring in the vicinity of an outer circumference of the brake ring, whereby a portion of the ribs in the area of the projections extends in a radial direction between the first and second projections to a maximum possible length. The screws are provided with a threaded portion on either end. Preferably, the screws have a securing means against rotation which may be embodied as mentioned above.

The advantage of the inventive embodiment of a divided brake disc is that a substantially enlarged rib surface for the cooling of the brake disc is provided compared to the known connections between brake ring sections.

DESCRIPTION OF PREFERRED EMBODIMENTS

The present invention will now be described in detail with the aid of several specific embodiments utilizing FIGS. 1 through 3.

Figure 2:
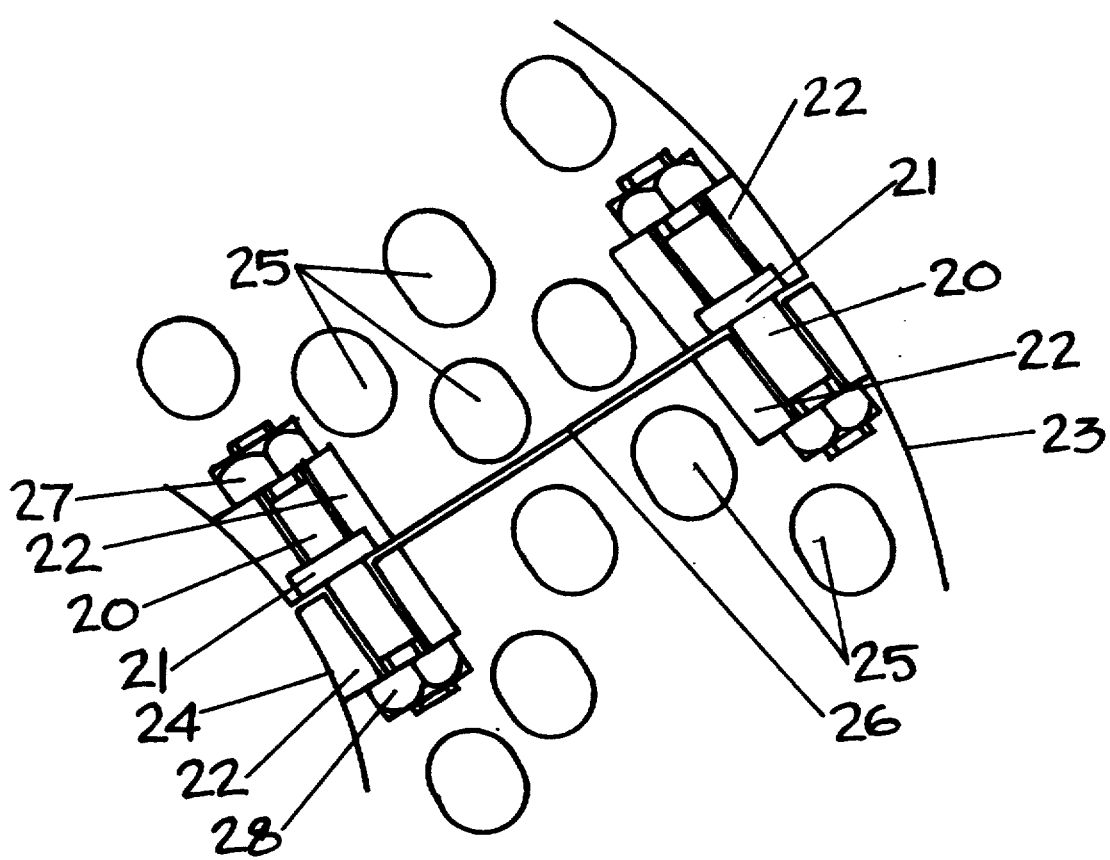
FIG. 2 shows a different embodiment of the connecting projections and connecting screws.

FIG. 1 shows the back side of a brake ring 11 which is divided by a dividing groove 12 along a plane that is parallel to the axis of the brake disc into two sections 11A and 11B. The surface of the brake ring 11 is provided with radially extending ribs 13 which between them form cooling air channels through which the cooling air for the heated brake disc is guided. In the neutral range of the brake ring the two brake ring sections 11A and 11B are provided with projections 14A and 14B on opposite sides of the dividing groove 12. Both projections 14A and 14B are provided with tangential bores 15A and 15B (extending transverse to the radially extending ribs) which are aligned with one another. A screw 16 that is provided with a threaded portion on both ends is inserted into the aligned bores 15A and 15B. Between the two threaded portions of the screw 16 a square bar 17 is provided which functions as a securing means against rotation. The square bar 17 is inserted into a respectively formed recess at the brake ring section 11A so that a rotation of the screw 16 during fastening is prevented. On both sides of the dividing groove 12 the screw 16 is secured by a respective nut 18A and 18B which is fastened to the ends of the screw 16 protruding from the projections 14A and 14B.

In some cases it is not sufficient to provide only one screw for the connection of the brake ring sections. In these cases two tangentially arranged screws 20 must be provided as is indicated in FIG. 2. A securing means against rotation 21 in the form of a square rod provided at the screws 20 must be provided also. The projections 22 are arranged such that they are as close as possible to the outer circumference 23 and the inner circumference 24 of the brake ring so that between the projections 22 the circular arrangement of the ribs 25 may be continued in the circumferential direction. At the dividing groove 26 there is thus no interruption of the rib arrangement provided over the surface of the brake ring so that the cooling effect of the cooling air is maintained between the two projections 22. This is especially important because in the known embodiments of divided brake discs the heating effect over the circumference of the brake disc was irregular thereby causing problems for the mounting of the brake ring sections to the hub or to the rail vehicle. It is easily understood that with the known embodiments of divided brake discs the dividing groove is heated to a greater extent than the other areas of the brake disc because in the dividing groove area no ribs are provided or the ribs are shorter so that the cooling effect is accordingly reduced.

When mounting the inventive brake discs the screws 16, 20 are first inserted with their square rod 17, 21 into a respective recess at the brake ring section and are then fastened via the nuts 18A, 28. Then, the other brake ring section 11B, 23 is slipped over the screws 16, 20 and is fastened by the nuts 18B, 27 so that the two sections are thereby fixedly connected. In the case of very small brake discs it might be necessary to provide the area around the nuts with a recess so that a wrench or a ratchet may be positioned on the nuts. However, in these cases the recesses can be designed small enough so that the cooling effect of the brake disc at the dividing groove is not impaired.

Figure 3:
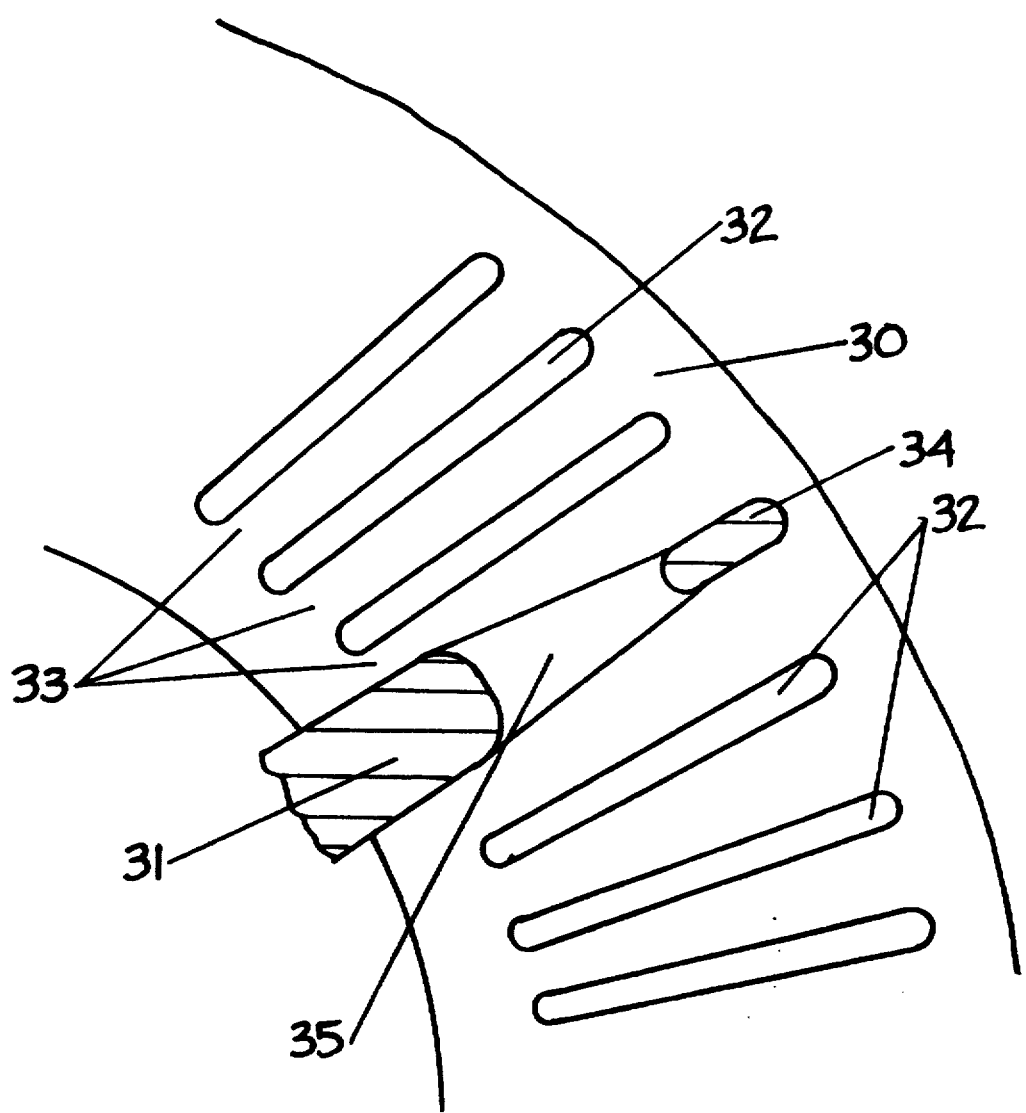
FIG. 3 shows an embodiment of a brake disc with an undivided brake ring having a selected rib formed as a projection.
Figure 3A:
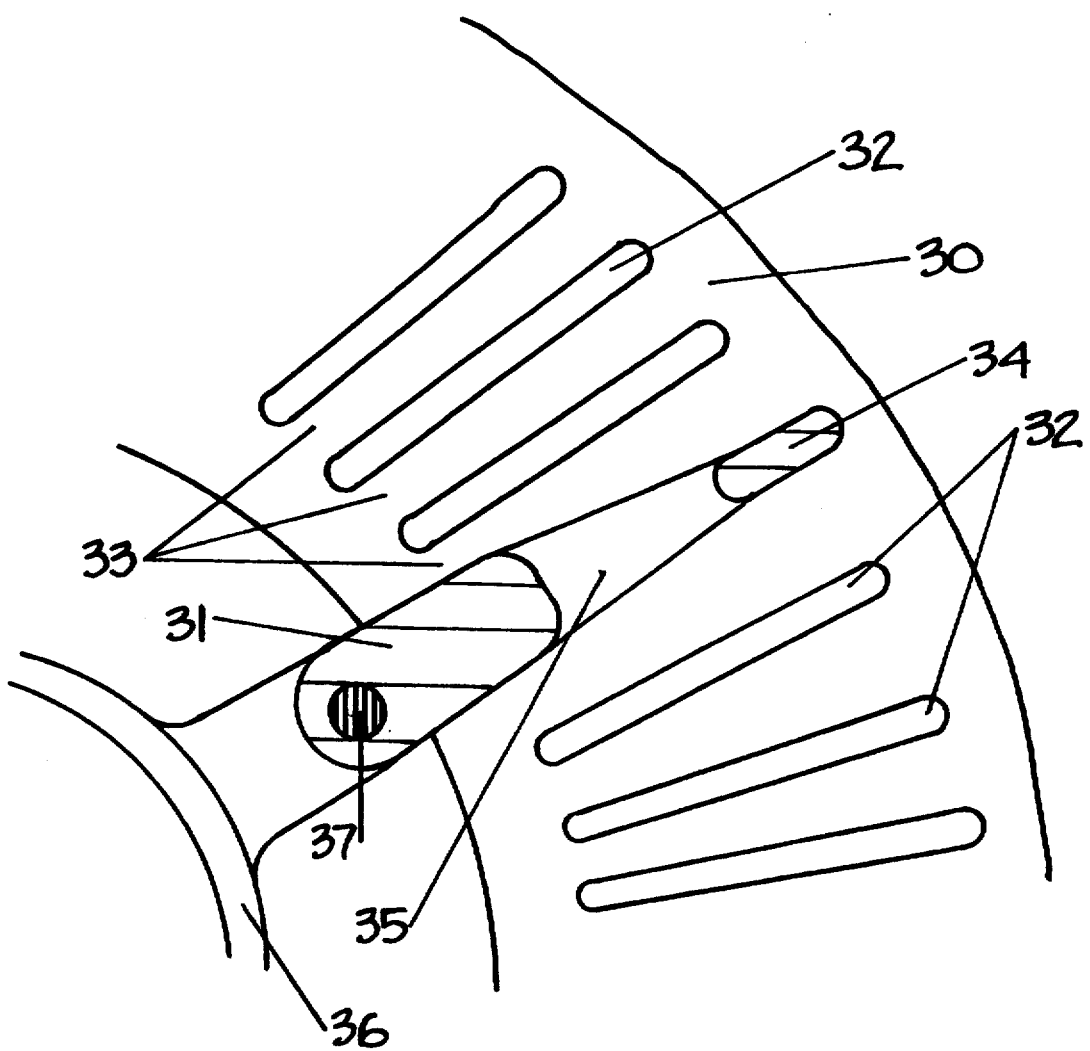
FIG. 3a shows a releasable connection of hub and brake ring.
Figure 3B:
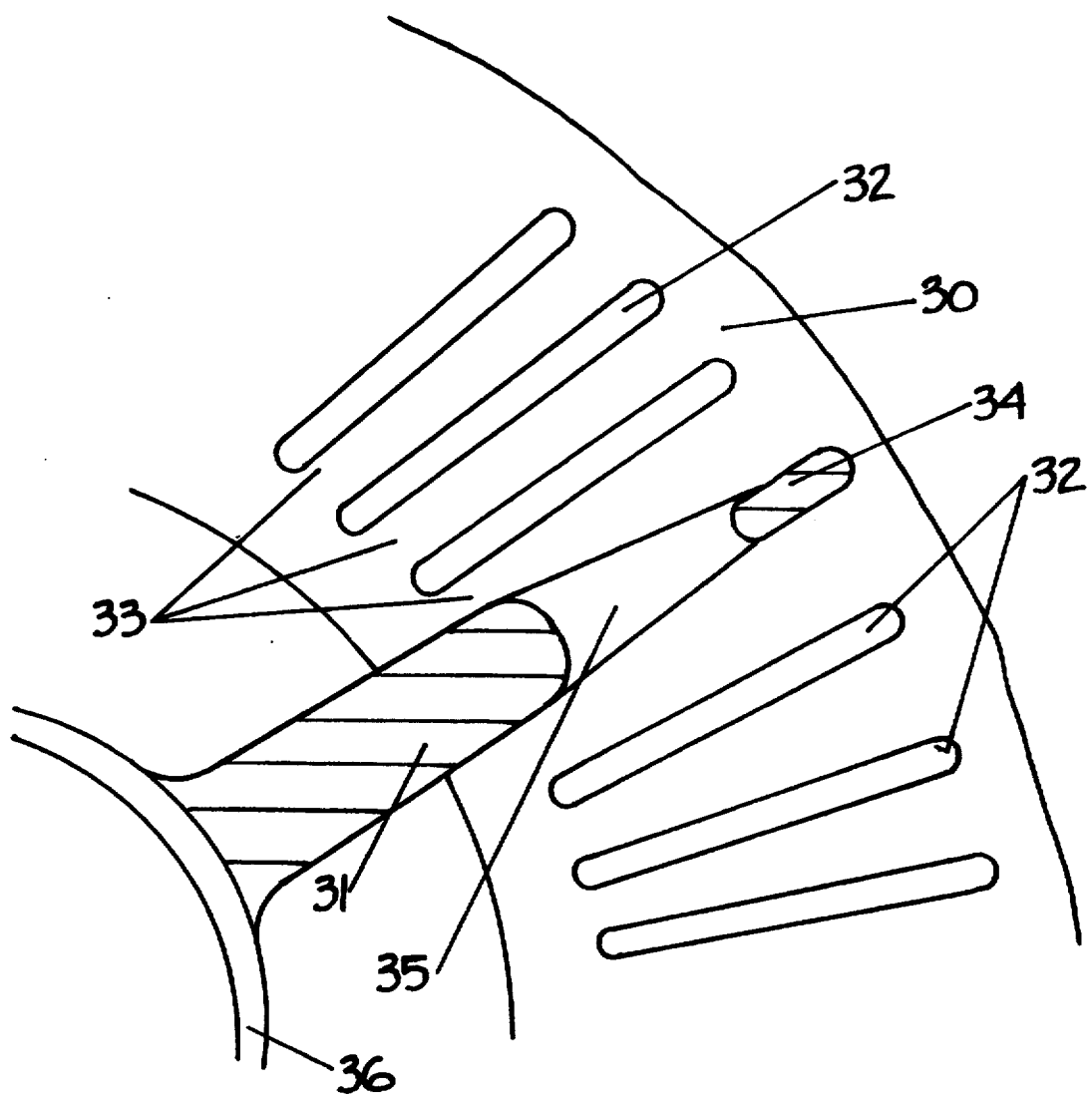
FIG. 3b shows the hub being fixedly connected to the brake ring.
Figure 3C:
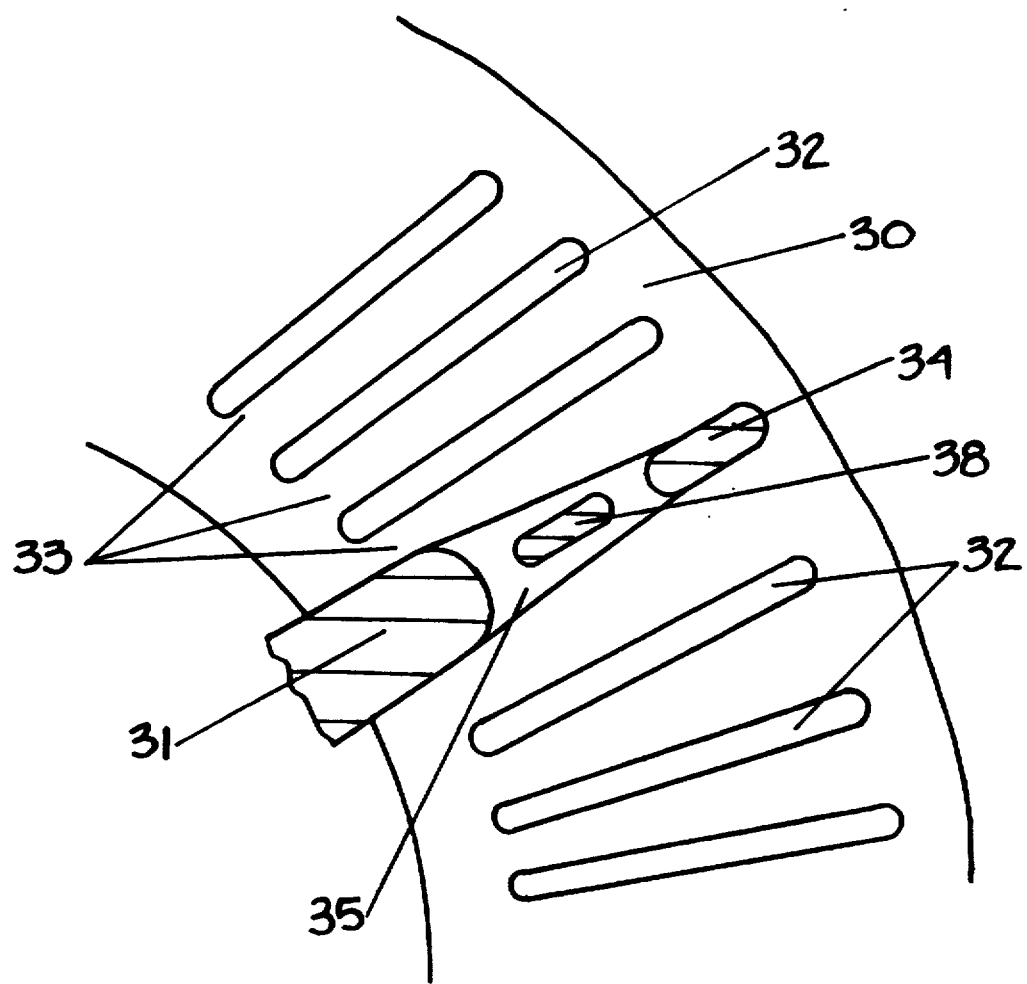
FIG. 3c shows an additional rib within the recess.
Figure 3D:
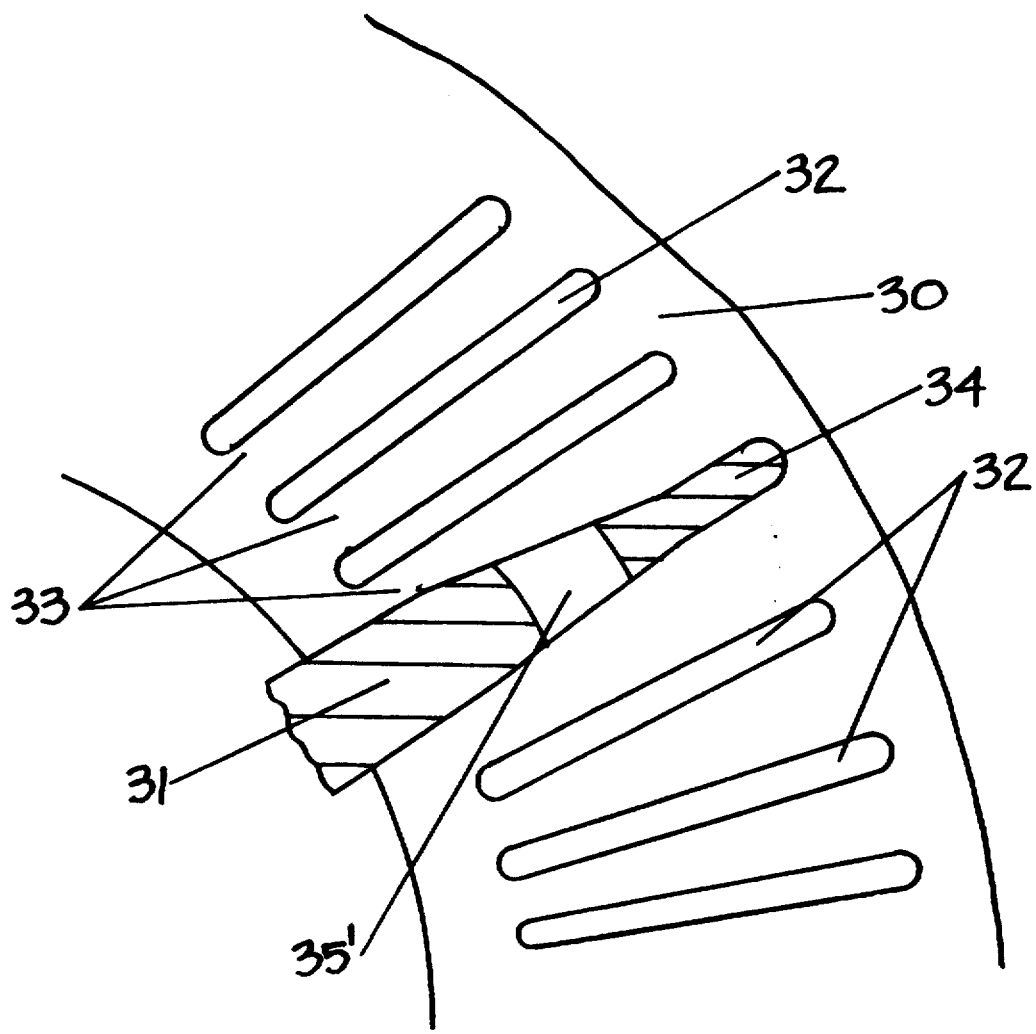
FIG. 3d shows a concentric recess.
Figure 3E:
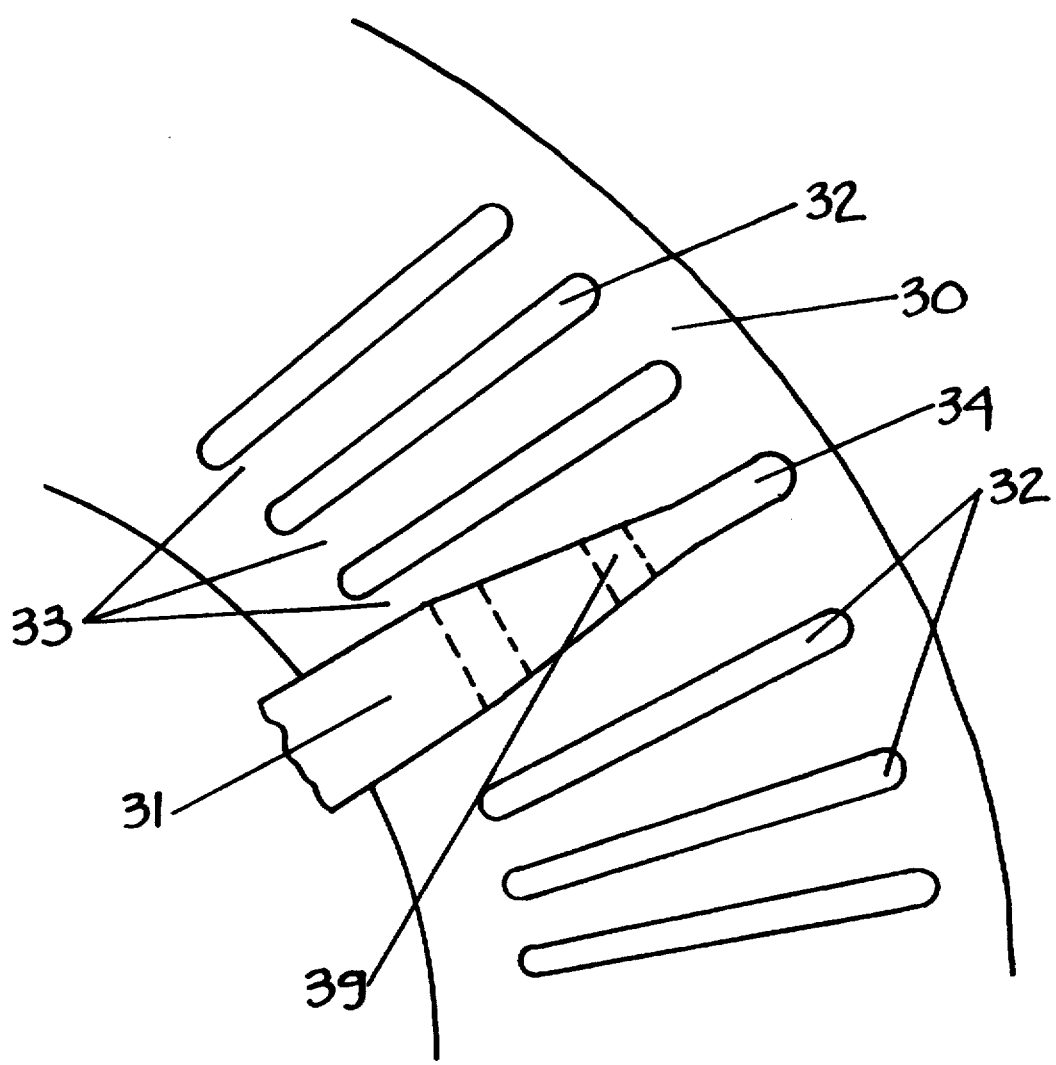
FIG. 3e shows bores extending through the projection.

The drawing according to FIG. 3 shows the back side of an undivided brake ring 30 which is connected to the hub (not represented) via projections 31 in a fixed or releasable manner (FIGS. 3b and 3a). Connector 37 in FIG. 3a illustrates a releasable connection. The hub together with the brake ring 30 may be formed as an integral part, for example, the hub and the brake ring may be cast in one piece. The brake ring 30 is provided with radial ribs 32 which form between them cooling air channels 33. Selected ribs 34 are elongated and widened in the direction towards the hub in order to form thereby projections 31. Since these projections 31 strongly impair the cooling air flow, a large section of their respective length is provided with recesses or perforations 35 which are extending essentially tangentially, whereby the dimensions and positions of the recesses are chosen such that they correspond to the requirements of the desired cooling effect. The recesses 35 may be provided as a plurality of smaller perforations or bores 39 as shown in FIG. 3e. It is only important that the cooling air may flow through the projection 31. The transversely oriented perforations or bores within the projections respectively the ribs may overcome the disadvantage of the obstructed radial cooling air flow.

The present invention is, of course, in no way restricted to the specific disclosure of the specification and drawings, but also encompasses any modifications within the scope of the appended claims.

What we claim is:

1. A ventilated brake disc for rail vehicles, said brake disc comprising an undivided brake ring connected to a hub, with radially extending ribs being provided on said brake ring, and projections for fastening said brake ring to the hub, said projections being connected to selected ones of said radially extending ribs, with said selected ribs being provided with tangentially extending recesses extending essentially transverse to said radially extending ribs, wherein in said tangential recesses further ribs are provided.

2. A ventilated brake disc according to claim 1, wherein said projections are formed as an integral part of said selected ribs by elongating said selected ribs.

3. A ventilated brake disc according to claim 1, wherein said projections are formed as an integral part of said selected ribs by widening said selected ribs.

4. A ventilated brake disc according to claim 1, wherein said projections are formed as an integral part of said selected ribs by elongating and widening said selected ribs.

5. A ventilated brake disc for rail vehicles, said brake disc comprising an undivided brake ring connected to a hub, with radially extending ribs being provided on said brake ring, and projections for fastening said brake ring to the hub, said projections being connected to selected ones of said radially extending ribs, with said selected ribs being provided with essentially transverse to said radially extending ribs, wherein said brake ring is connected to said hub in a releasable manner.

6. A ventilated brake disc according to claim 5, wherein said projections are formed as an integral part of said selected ribs by elongating said selected ribs.

7. A ventilated brake disc according to claim 5, wherein said projections are formed as an integral part of said selected ribs by widening said selected ribs.

8. A ventilated brake disc according to claim 5, wherein said projections are formed as an integral part of said selected ribs by elongating and widening said selected ribs.

9. A ventilated brake disc for rail vehicles, said brake disc comprising an undivided brake ring connected to a hub, with radially extending ribs being provided on said brake ring, and projections for fastening said brake ring to the hub, said projections being connected to selected ones of said radially extending ribs, with said selected ribs being provided with tangentially extending recesses in the form of bores extending essentially transverse to said radially extending ribs.

10. A ventilated brake disc according to claim 9, wherein said projections are formed as an integral part of said selected ribs by elongating said selected ribs.

11. A ventilated brake disc according to claim 9, wherein said projections are formed as an integral part of said selected ribs by widening said selected ribs.

12. A ventilated brake disc according to claim 9, wherein said projections are formed as an integral part of said selected ribs by elongating and widening said selected ribs.

* * * * *